UNITED STATES PATENT OFFICE.

ERIK ÖMAN, OF STOCKHOLM, SWEDEN.

METHOD OF SEPARATING WATER OR OTHER LIQUIDS FROM SOLUTIONS.

1,359,911.   Specification of Letters Patent.   Patented Nov. 23, 1920.

No Drawing.   Application filed September 18, 1917. Serial No. 191,988.

*To all whom it may concern:*

Be it known that I, ERIK ÖMAN, docent, Stockholm, in the Kingdom of Sweden, have invented certain new and useful Improvements in Methods of Separating Water or other Liquids from Solutions; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In concentrating solutions by separating water or other liquids from the same the method of boiling and subsequent distillation either at ordinary temperature or in vacuo has hitherto been used almost exclusively in the chemical industry.

In many cases, however, the heating of the liquid causes inconveniences of one or the other kind, as for instance in the case of sulfite or sulfate solutions.

In heating sulfite solutions gypsum is easily formed and sometimes even a decomposition of the organic substances contained in the solution may occur. In addition thereto the distillation requires a considerable amount of heat and this method is therefore very expensive.

The object of my invention is to overcome said inconveniences, which is attained by subjecting the solution to be concentrated while being stirred to a temperature below the freezing point. The solution is preferably subjected to this treatment several times, the snow and ice crystals formed being each time separated, preferably by filtering or by the centrifugal method.

The method may be used with great advantage for concentrating sulfite solution which shall be concentrated for the purpose of recovering alcohol. Such solution contains about 10% dry substances (about 2.5% sugar and 7.5% other substances).

According to my invention the solution may easily be concentrated up to a content of about 40% of dry substance. The method is then preferably carried out in the following way:

The sulfite solution is cooled to about $-1$ to $-2°$ C. the formation of ice then commencing. At the same time the liquid is stirred so that the ice formed is obtained in the form of snow and ice crystals which are free of the organic and inorganic substances dissolved in the sulfite solution. The snow and ice crystals may be separated by filtering or by the centrifugal method or in any other suitable way. In filtering by means of vacuum snow crystals are obtained which in melting yield water with a content of dissolved substances amounting to only $\frac{1}{10}$ to $\frac{1}{15}$ of the content of substances dissolved in the original solution. By using the centrifugal method the sulfite solution may be separated still more completely from the crystals.

The concentrated sulfite solution thus obtained may be cooled once more and treated again in the way described this being repeated till the desired concentration is obtained. For each freezing operation $\frac{1}{3}$ to $\frac{1}{4}$ of the volume of the solution may thus be separated in the form of snow crystals. The thicker the solution grows, the lower the temperature which must be used. At a content of for instance 40% of dry substance the temperature must be lowered to about $-5°$ C.

If one desires to proceed further than to 40% of dry substance, snow crystals may still be separated, but the filtering is more difficult owing to the low temperature and also because of the thick syruplike consistence of the liquid.

When starting for instance with 10 liters of sulfite solution one can to obtain at first freezing operation about 4 kg. snow crystals and about 6 liters filtrate with 16% of dry substance. At the second freezing operation about 2 kg. snow crystals and about 4 liters filtrate with about 23.5% of dry substance are obtained. In the next freezing operation about 1 kg. snow crystals and 3 liters filtrate with 30.7% of dry substance are obtained and at the further freezing operation about 0.7 kg. snow crystals and 2.3 liters filtrate with 39% of dry substance may be obtained.

The amount of sugar contained in the different filtrates corresponds to the content of dry substance, so that for instance if the content of sugar was 2.5% in the beginning it will be about 9.75% in the last filtrate.

The solution which cannot be separated from the snow crystals may be eliminated in any practical manner.

The method is the same when applied to a sulfate solution which for instance is to be concentrated for the purpose of further treatment. In this case, however, the temperature must be kept considerably lower as the sulfate solution begins to freeze at about —9 to —10° C. When concentrated it freezes only at about —15° C.

The amount of sulfate solution which remains in the crystals may be forced out by means of a liquid which is preferably as cold or colder than the ice crystals, for instance water, sulfate solution (diluted, if desired) or better still a cooled salt solution. If water is used, the disadvantage arises owing to the difference of temperature, that part of the snow and ice crystals formed are dissolved as the temperature of the water cannot be lowered to that of the ice crystals.

Evidently, the method may be applied not only to sulfite and sulfate solutions which have not been subjected to a previous treatment, but also to such solutions which have been subjected to a treatment suitable for the succeeding treatment. When using sulfite solution for instance, the solution may previous to the treatment according to my invention be wholly or partly neutralized or made alkaline and if desired it may also be further prepared for fermentation and even be deprived of its sugar by fermentation. If desired, the treatment may then take place before the alcohol formed in the fermentation process is separated by distillation.

In addition thereto, the method may evidently be applied to many different solutions which are to be concentrated for one or the other purpose, as for instance sugar solutions, alcohol solutions, solutions of organic or inorganic substances in general, glycerin and so on.

The solvents may obviously also be other than water.

The lowering of temperature to which the solution is subjected may, after the snow and ice crystals have been separated, obviously be utilized for one or the other purpose, preferably for the process itself. The low temperature of the crystals may for instance be used for lowering the temperature of such a solution which is to be concentrated, or may be utilized in cooling machines when such are used. It is also possible to make use not only of the low temperature of the ice crystals but also of that of the concentrated solution for the carrying out of the process. By such regeneration the process will evidently be more economical.

Where possible the melting water of the snow and ice crystals may be used for preparing a new solution. Thus no dry substance or none of the dissolved substances will be lost as the small part which is carried off with the ice crystals is returned to the solution. In the sulfite or sulfate industry this melting water may for instance be used with advantage instead of the water necessary for preparing new boiling liquid.

I claim as my invention:

1. The method of concentrating sulfite and sulfate solutions which consist in subjecting the solution while being stirred to a temperature below the freezing point, and then separating the ice or snow crystals formed from the solution.

2. The method as specified in claim 1, with the additional step of again subjecting the solution to a freezing temperature below the said first temperature and again separating the ice or snow crystals from the solution, and further repeating this process if desired.

In testimony that I claim the foregoing as my invention I have signed my name in presence of two subscribing witnesses.

ERIK ÖMAN.

Witnesses:
GUSTAF FERDINAND JANSSON,
GRETA PRIM.